Patent 2,698,862

2,698,862

HYDROGENATION OF CARBON MONOXIDE UTILIZING AN ALLOY CATALYST

Reimer E. Probst, Hammond, Ind., assignor to Standard Oil Company, Chicago, Ill., a corporation of Indiana No Drawing. Application October 15, 1951,
Serial No. 251,453

10 Claims.  (Cl. 260—449)

This invention relates to hydrocarbon synthesis and has more particular reference to a hydrocarbon synthesis process employing an improved catalyst. Hydrocarbon synthesis is a well-known process consisting essentially of reacting carbon monoxide and hydrogen in ratios between about 2:1 and 1:3 and usually at temperatures between about 200° and 700° F. and pressures from one to forty atmospheres in the presence of a catalyst, separating product oils from the effluent gas stream, and recovering predominantly normally liquid hydrocarbons and some oxygenated hydrocarbons from the product oils. The process is described in considerable detail in Phinney et al. 2,527,846.

Well-known catalysts in the development of hydrocarbon synthesis have been the Fischer-Tropsch catalyst, which is a cobalt-thoria catalyst, and an iron catalyst which is usually promoted with an alkali metal compound and is especially suitable for obtaining high conversions and good selectivity at the pressures and temperatures listed above. While many improvements have been made in these catalysts which consist of such expedients as the addition of promoters, the provision of strengthening supports, and the governing of the size and shape of the catalyst particles, a requirement of operation when employing these catalysts has been the removal of the catalyst at intervals from the reaction zone and the regeneration of the catalyst by method and means which include removing deposited carbon or waxes or the like from the catalyst with preoxidation and subsequent reduction, and other pretreatment of the catalyst. Provision must also be made for maintaining the promoter content of the iron catalyst because it appears to lose active promoter during reaction.

A primary object of the present invention is the provision of a process of hydrocarbon synthesis employing a new and improved catalyst. Another object of the invention is the provision of a hydrocarbon synthesis catalyst which remains throughout even prolonged synthesis periods relatively free of inhibiting deposits and does not require frequent regeneration. Yet another object of the invention is the provision of a hydrocarbon synthesis catalyst that is resistant to reduction in particle size during synthesis and consequently is well adapted to moving bed or fluid bed processes where stability of particle size is important, and is also well adapted to fixed bed operation where contamination of product by the spalling of catalyst is substantially completely avoided. The invention has for other objects such other advantages or results as will be found in the specification and the claims hereinafter made.

I have found that an alloy, which comprises essentially from about five to thirty atomic percent of manganese, from about forty to seventy atomic percent of a metal selected from the group consisting of copper and silver, and from about fifteen to forty-five atomic percent of a metal selected from the group consisting of aluminum and tin, will provide an improved hydrocarbon synthesis process in which, at a selected temperature, no decrease in catalyst activity nor disintegration of the catalyst was observed, even after four weeks' operation. The catalyst alloy is a fused reduction product of a mixture of the foregoing metals or of a mixture of compounds containing the foregoing metals. The catalyst can be distributed at spaced intervals upon a support such as carbon, kieselguhr, clay, or the like. The catalyst can also be used in unusually large size, for example about 4-mesh sized pieces, in a fixed bed reactor, or it can be used to advantage in comminuted form in moving bed or fluid bed reactors.

The relative proportions of metals in the alloy catalyst are defined by atomic percentages in order to provide a measure applicable to all the disclosed metals and particularly to emphasize the fact that the catalyst is not simply a mixture but a crystalline alloy having the metals distributed as atoms in a crystal structure. An example of the proportion of metals by weight in a typical alloy hydrocarbon synthesis catalyst as herein disclosed is one having thirty-eight percent by weight manganese, eighteen percent by weight aluminum, and forty-four percent by weight copper.

A preferred method of preparing the improved catalyst includes forming a mixture of the several metals, sintering the mixture and thereafter fusing the same in a reducing atmosphere. It is preferred carefully to anneal the so-formed alloy so that the crystalline structure of the alloy can be well formed. The alloy is ferromagnetic and it appears to be most active catalytically at the Curie temperature, the temperature at which the alloy loses its magnetic properties. For the manganese-aluminum-copper alloy this temperature is about 650° F.

Another method of preparing the catalyst is to form a solution of salts of manganese and the selected other metals, for example of the nitrates of these metals, and thereafter to precipitate from these solutions compounds containing the metals, preferably upon a support. Thereafter, the precipitated compounds are fused and reduced in a reducing atmosphere of, for example, hydrogen. While it is believed that substantially complete reduction of the manganese and selected metal compounds is obtained by the foregoing reducing treatment and that it is the reduced alloy which is effective catalytically, the catalyst may contain oxides of the metals of a low valence or low degree of oxidation.

A manganese alloy catalyst prepared by, for example, one of the above methods, will exhibit catalytic activity in hydrocarbon synthesis at temperatures as low as 140° F. Reaction can be carried on as high as 1200° F.; but a more effective operating range is between about 300° and 1000° F. and preferably between about 400° and 800° F. Suitable operating pressures are from about atmospheric to about 600 pounds per square inch gauge, and preferred pressures fall within the range of about 250 pounds per square inch to about 500 pounds per square inch gauge. As is usual in hydrocarbon synthesis, the ratio of carbon monoxide to hydrogen can vary between about 2:1 to 1:3, and space velocity between about 50 to 1000 volumes of gas per volume of catalyst per hour are suitable. (Gas volumes measured at 60° F. and atmospheric pressure.)

In the following specific examples, which are supplied for purposes of illustration, the improved catalyst is illustrated under pilot plant conditions in two different atomic ratios, as solid alloy catalyst, and as catalyst dispersed upon a support.

EXAMPLE I

The catalyst that was used in the example was prepared by heating copper to its melting point in an induction furnace and then adding aluminum. After the aluminum was added the heat was shut off and manganese was stirred under the liquid. The liquid alloy was then poured out upon an iron plate and was allowed to cool and solidify, and thus to freeze in the desired crystal structure. The crystal structure was stabilized by means of aging at 150° C. for about forty-eight hours. It was then cooled to room temperature and broken into small pieces varying from 80 mesh to about 4 mesh. The catalyst was reduced in a stream of hydrogen gas at a temperature of 450° F. for twenty-nine hours.

A fixed bed reactor was charged with the prepared catalyst which consisted of twenty-five atomic percent of aluminum, fifteen atomic percent of manganese, and sixty atomic percent of copper, as determined by emission spectroscopy. The catalyst was formed by fusing the three metals in the given proportion in a reducing atmosphere and thereafter annealing the alloy to remove strain lines and allow the formation of the proper crystalline structure. The catalyst particles were relatively large, the longest dimension of each particle being between about one half and three quarters of an inch.

Synthesis gas consisting essentially of hydrogen and carbon monoxide in a mol ratio of 2:1 was flowed at a rate of 200 volumes of gas per volume of catalyst per hour over the alloy in the reactor under three hundred pounds per square inch gauge pressure. The temperature in the reactor was raised from about 300° to about 600° F. in a preconditioning step, during which the rate of conversion of the carbon monoxide was low. Thereafter the synthesis was continued at temperatures between 625° and 700° F. It will be observed that an average conversion of carbon monoxide of better than eight-five percent and an average yield of normally liquid hydrocarbons of about twenty to thirty-five percent was obtained.

Table I

Catalyst: 25 At.percent Al+15 At.percent Mn+60 At.percent Cu-Alloy
Run Conditions: 2:1 $H_2/CO$ Synthesis Gas, 200 Vg/Vc/Hr., 300 p. s. i. g. pressure

| Run Period | A | B | C | D | E |
|---|---|---|---|---|---|
| Time, Hours | 24 | 120 | 120 | 96 | 72 |
| Temp. (°F.) | 650 | 650 | 675 | 625 | 700 |
| Percent CO Conversion [1] | 84.8 | 92.0 | 91.8 | 79.8 | 85.0 |
| Product Yields: | | | | | |
| Grams $C_3+$/Cu. m. | 33 | 41 | 49 | 58 | 39 |
| $H_2+$CO Consumed | | | | | |
| Percent Carbon Converted to: [1] | | | | | |
| $CO_2$ | 28.2 | 27.2 | 25.5 | 32.8 | 25.8 |
| $CH_4$ | 30.8 | 38.0 | 37.5 | 35.2 | 41.2 |
| $C_2$ | 5.1 | 10.3 | 16.7 | 8.9 | 10.6 |
| $C_3+$ | 35.9 | 23.4 | 19.3 | 20.1 | 17.7 |
| Water Soluble Chem.[2] | | 1.1 | 1.0 | 3.0 | 4.7 |
| Total | 100.0 | 100.0 | 100.0 | 100.0 | 100.0 |

[1] Based on 100% carbon balance on an output basis.
[2] Calculated as ethanol.

It is observed that no substantial decrease in catalyst activity with respect to carbon monoxide conversion occurs throughout the prolonged test.

EXAMPLE II

A fixed bed reactor was charged with a catalyst consisting of a coconut-charcoal support and fifteen percent by weight of an alloy deposited thereon consisting of about forty-five atomic percent aluminum, five atomic percent of manganese, and fifty atomic percent of copper as determined by emission spectroscopy. The charcoal pellets were about one quarter of an inch in their longest dimension and were prepared by depositing upon the charcoal particles a nitric acid solution of the aforesaid alloyed metals in the proportions there recited. The catalyst was then treated at an elevated temperature in a reducing atmosphere of hydrogen and the metals of the salts were formed and fused.

Synthesis gas in a mol ratio of 2:1 was passed through the reactor at a rate of 200 volumes of gas per volume of catalyst per hour and at a pressure of three hundred pounds per square inch gauge. After an initial induction period, reflected in the yields reported below for period A, the extent of conversion of carbon monoxide continued to increase with increase in length of time of the catalyst in the reactor and increased reaction temperature. It can be seen from the yields reported in Table II below that raising the reaction temperature to temperatures above about 750° F., while continuing to increase the percentage of conversion, does not result in adequate yields of liquid hydrocarbons. It is preferable therefore to effect reaction at temperatures between about 650° and 750° F. with the type of alloy employed in the specific example. Results obtained at higher temperatures, that is, at 800° F., 900° F., and 975° F., are included in Table II; it will be noted that CO conversion is higher, but the amount converted to $C_3+$ is greatly reduced.

Table II

Catalyst: 15 Wt. percent Al, Mn, Cu applied as an aqueous solution of the nitrates to coconut charcoal in the ratio of 45 At. percent Al, 5 At. percent Mn, and 50 At. percent Cu
Run Conditions: 2:1 $H_2/CO$ Synthesis Gas, 200 Vg/Vc/Hr., 300 p. s. i. g. pressure

| Run Period | A | B | C | D | E | F | G | H | J |
|---|---|---|---|---|---|---|---|---|---|
| Time, Hours | 120 | 120 | 120 | 120 | 120 | 120 | 120 | 120 | 120 |
| Temp. (°F.) | 300–650 | 650 | 675 | 700 | 700 | 700 | 700 | 800 | 900 | 975 |
| Percent Contraction [1] | 11.5 | 21.4 | 24.0 | 30.1 | 24.1 | 21.4 | 39.6 | 49.4 | 48.5 |
| Percent CO Conversion [2] | 19.2 | 44.7 | 45.1 | 64.8 | 52.2 | 44.7 | 87.9 | 88.5 | 92.6 |
| Product Yield: [1] | | | | | | | | | |
| Grams $C_3+$/Cu. m. | 12 | 28 | 65 | 89 | 93 | 83 | 52 | 25 | 21 |
| $H_2+$CO Consumed | | | | | | | | | |
| Product Distribution—Mol Percent Carbon Converted to: [2] | | | | | | | | | |
| $CO_2$ | 45.6 | 38.1 | 44.0 | 34.2 | 36.0 | 34.5 | 29.2 | 30.6 | 25.7 |
| $CH_4$ | 25.3 | 43.0 | 18.2 | 26.8 | 25.6 | 25.7 | 41.4 | 49.1 | 51.8 |
| $C_2$ | 21.5 | 5.4 | 6.3 | 6.7 | 5.7 | 5.3 | 10.8 | 9.0 | 13.3 |
| $C_3+$ | 6.3 | 11.3 | 29.6 | 31.1 | 30.8 | 32.2 | 18.1 | 11.0 | 8.9 |
| Water Soluble Chem.[3] | 1.3 | 2.2 | 1.9 | 1.2 | 1.9 | 2.3 | 0.5 | 0.3 | 0.3 |
| Total | 100.0 | 100.0 | 100.0 | 100.0 | 100.0 | 100.0 | 100.0 | 100.0 | 100.0 |

[1] Based on observed weight balance.
[2] Based on 100% carbon balance on an output basis.
[3] Calculated as ethanol.

In preferred operation, unreacted carbon monoxide can be separated from product gases and be recycled. Improved yields of liquid product can also be obtained by contacting reaction gases and alloy catalyst first at a temperature near or above the Curie temperature point of the catalyst (about 1000° F. for the foregoing catalyst) to effect high conversions of carbon monoxide and then at a lower temperature, usually about 300 to 600° F., that is optimum to produce liquid hydrocarbons.

It was demonstrated that individual metals, either supported or unsupported, of the alloys defined above do not separately act with any substantial degree of success as hydrocarbon synthesis catalysts. While manganese alone demonstrated some activity, manganese supported on cocoanut charcoal was substantially inactive, as was also aluminum and copper employed alone. A copper, tin and manganese alloy was tried and showed some activity to produce liquid hydrocarbons at 700° F.

Variations in atomic ratio within the catalyst and variations of the secondary metals employed, in other words, silver for copper and zinc for aluminum, will require different optimum values to obtain high conversion yields. These can be selected within the general range of hydrocarbon synthesis operations to suit the selected catalyst.

On the other hand, the catalyst itself can be selected to suit other desired conditions. If a higher rate of conversion is desired, an alloy of the catalyst components that will be less active at the lower temperatures and a suitable activity at the higher temperatures should be selected.

In none of the above examples was any deposit of wax or hydrocarbon found on the catalyst at the conclusion of the runs. It is observed also that the activity of the catalyst does not substantially diminish during the course of the reported runs. The catalysts in the foregoing examples were of unusually large particle size, but it is noted, nevertheless, that substantial yields of normally liquid hydrocarbons were obtained. Within the scope of this invention, also, is the employment of the catalyst in finely divided state in, for example, either moving bed or fluid bed systems, in which it may be expected that higher conversion rates can be obtained at lower temperatures, which are more productive of liquid hydrocarbons.

Having described my invention, I claim:

1. A process of preparing normally liquid hydrocarbons from hydrogen and carbon monoxide, which process comprises flowing the said gases in a mol ratio between about 2:1 and 1:3 mols of carbon monoxide per mol of hydrogen into a reaction zone at a pressure between about atmospheric and 600 pounds per square inch gauge at a temperature between about 140° and 1000° F., and therein effecting reaction between the said gases in the presence of a catalyst consisting essentially of an alloy containing about five to thirty atomic percent of manganese, about fifteen to forty-five atomic percent of at least one metal selected from the group consisting of aluminum and tin, and about forty to seventy atomic percent of at least one metal selected from the group consisting of copper and silver.

2. The process of claim 1 in which the catalyst consists essentially of an alloy containing manganese, aluminum, and copper.

3. The process of claim 1 in which the catalyst consists essentially of an alloy containing manganese, tin, and copper.

4. The process of claim 1 in which the catalyst consists essentially of an alloy containing manganese, aluminum and silver.

5. The process of claim 1 in which the catalyst consists essentially of an alloy containing manganese, tin, and silver.

6. A hydrocarbon synthesis process for the preparation of normally liquid hydrocarbons from hydrogen and carbon monoxide, which process comprises the steps of passing carbon monoxide and hydrogen in a mol ratio between about 2:1 and 1:3 into a reaction zone under a pressure between about atmospheric and 600 pounds per square inch gauge at a temperature between about 650° and 800° F., effecting reaction between the said gases in the said zone in the presence of a catalyst that consists essentially of an alloy containing about five atomic percent of manganese, about forty-five atomic percent of aluminum, and about fifty atomic percent of copper, withdrawing product and unreacted gases from the reactor in an effluent gas stream, condensing and separating normally liquid hydrocarbons from the effluent gas stream and recycling unreacted gases to the reactor.

7. The process of claim 6 in which the reactor temperature is maintained at about 700° F.

8. The method of effecting hydrocarbon synthesis from carbon monoxide and hydrogen which method comprises introducing carbon monoxide and hydrogen in a mol ratio between about 2:1 and 1:3 into a reaction zone at a pressure in the range of atmospheric to about 600 pounds per square inch gauge at a temperature in the range of 140° F. to 1000° F. and therein contacting said gases with a catalyst at a space velocity in the range of about 50 to 1000 volumes of gas per hour (measured at 60° F. and atmospheric pressure) per volume of catalyst in the reaction zone, said catalyst consisting essentially of an alloy containing about 5 to 30 atomic percent of manganese, about 15 to 45 atomic percent of aluminum and about 40 to 70 atomic percent of copper.

9. The method of claim 8 wherein said catalyst is disposed at spaced intervals throughout a porous carrier.

10. The method of claim 9 wherein the carrier is an activated carbon.

References Cited in the file of this patent

UNITED STATES PATENTS

| | | |
|---|---|---|
| 1,007,548 | Durville | Oct. 31, 1911 |
| 1,939,708 | Larson | Dec. 19, 1933 |
| 2,258,492 | Hensel et al. | Oct. 7, 1941 |

FOREIGN PATENTS

| | | |
|---|---|---|
| 229,714 | Great Britain | Feb. 23, 1925 |